UNITED STATES PATENT OFFICE.

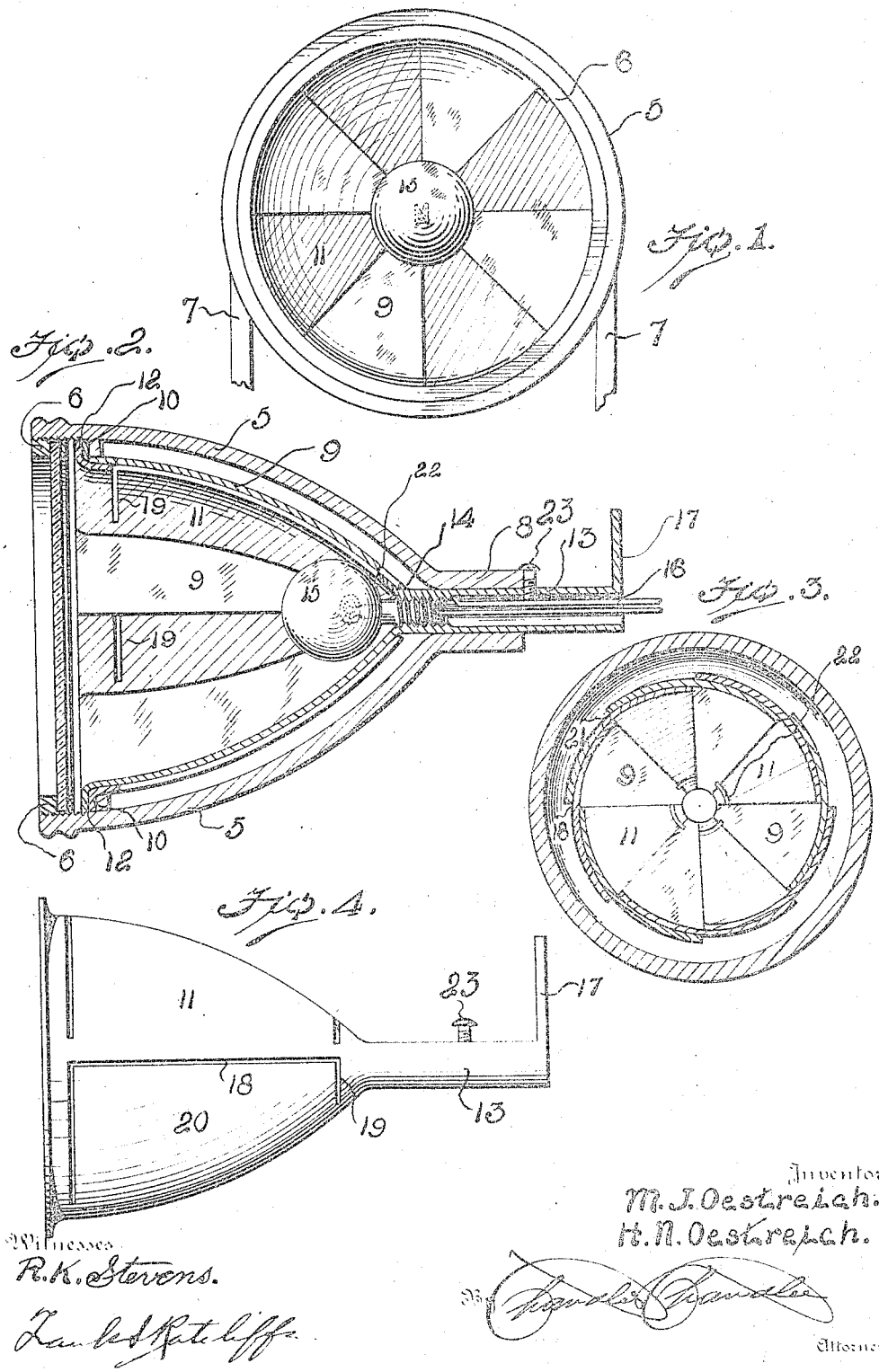

MAURUS J. OESTREICH AND HENRY N. OESTREICH, OF PHILADELPHIA, PENNSYLVANIA.

CONVERTIBLE REFLECTOR FOR LAMPS.

1,160,950.  Specification of Letters Patent.  Patented Nov. 16, 1915.

Application filed June 28, 1915. Serial No. 36,840.

*To all whom it may concern:*

Be it known that we, MAURUS J. OESTREICH and HENRY N. OESTREICH, citizens of the United States, residing at Philadelphia, in the county of Philadelphia, State of Pennsylvania, have invented certain new and useful Improvements in Convertible Reflectors for Lamps; and we do hereby declare the following to be a full, clear, and exact description of the invention, such as will enable others skilled in the art to which it appertains to make and use the same.

This invention relates to new and useful improvements in reflectors for lamps and is particularly directed to the provision of a reflector for automobile lamps of relatively high power which is provided with means for reducing, as desired, the amount of light thrown out by the lamp.

The intensity of light necessary to properly illuminate a road when traveling thereover constitutes a serious inconvenience when two vehicles attempt to pass each other in that the glare blinds the drivers so that they cannot see the other vehicle. Also, in cities the use of a glaring head light is generally prohibited.

It is therefore the object of the invention to provide means associated with high power lamps of automobiles or other vehicles whereby the amount of light given out by lamps may be reduced as desired, and it is more specifically the object to accomplish this by providing means whereby the reflectors of the lamps may be covered by shield portions having relatively low power of reflection.

It is further an object to provide such means for dimming the lights of lamps wherein electricity supplies the light.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a front elevation of an electric automobile lamp constructed in accordance with the present invention and showing the reflector portion thereof partly covered by the dimming shield. Fig. 2 is a central vertical sectional view through the structure shown in Fig. 1. Fig. 3 is a transverse sectional view. Fig. 4 is a side elevation of the reflector dimming shield removed.

Referring now more particularly to the accompanying drawings there is shown an electric head light of the type generally used on automobiles and including the cup-shaped lamp casing 5 carrying at its mouth the usual lamp ring 6 and adapted to be supported as by the usual bracket 7. The base of this casing is provided with a bearing portion 8.

The reflector for the lamp comprises a cup-shaped member 9 which seats in the casing and is held thereto by a lateral flange 10 at its mouth. The shield member 11 for covering the reflector to dim the light is also cup-shaped to seat within the reflector portion and is provided at its mouth with a flange 12 slidably resting against the reflector flange 10. The base of the shield member carries a sleeve 13 which extends through an opening 14 in the base of the reflector and through the bearing 8 of the lamp casing. This sleeve carries the lamp proper 15 and the wires 16 which supply it with current and the sleeve extends outwardly of the bearing 8 and carries a lateral arm 17 whereby the shield may be rotated.

The shield is provided with slots 18 extending radially from a point adjacent its base to a point adjacent its mouth portion and the ends of these slots are extended laterally at 19 concentric to the axis of the shield to form tongues 20, the shield being divided into quadrants by these slots. The reflector member 9 is provided with slots 21 similarly disposed with relation to the slots 18 and having their ends laterally directed at 22 in a similar manner, and the tongues 20 are introduced into the slots 21 to extend between the reflector member and the casing so that upon rotation of the shield member the tongues will pass into the slots 21 and the lateral portions 19 and 22 of the respective slots and will interlock to permit the shield member to slide wholly behind the reflector. It is not however desired to assume this position, as the shield will remain sufficiently lapped with relation to the reflector member as to facilitate its rotative movement to cover the reflector, which can be readily accomplished by giving the shield member a quarter turn. The shield member is held against displacement, as by a stop screw 23 threaded therein outwardly of the bearing 8. Thus a comparatively simple lamp structure has been provided whereby the reflector can be covered at will to materially reduce the amount of light normally thrown out and wherein the efficiency of the reflector when it is desired to utilize the full benefit thereof is not impaired.

While we have illustrated and described a particular embodiment of our invention, we have merely done so for the sake of convenience and we do not wish to be limited to that particular embodiment as it is obvious that numerous changes may be made within the details of construction thereof without in any way departing from the spirit of the invention or exceeding the scope of the appended claims.

What we claim is:—

1. In a lamp, the combination with a casing, of a cup-shaped reflector held in the casing, a cup-shaped shield member seated in the reflector member, said shield member and reflector member being provided with co-acting slotted portions whereby the shield member may be rotated and having its major portion lie outwardly of the reflector member and means for rotating the shield member.

2. In a lamp, the combination with a cup-shaped reflector member having an opening in its base, a cup-shaped member seated in the reflector member, a lamp carrying sleeve carried by the guide member and extended through the opening of the shield, and said shield and reflector members being provided with coacting slotted portions whereby upon rotation of the shield member it may move to lie outwardly of the reflector member to expose the same.

3. In a lamp, the combination with a cup-shaped reflector member having a flange at its mouth and an opening in its base, of a cup-shaped shield member seated in the reflector member and provided at its mouth with a flange bearing against the reflector flange, and a lamp carrying sleeve carried by the base of the shield and passed through the reflector base and said shield and reflector being provided with similar radial slots with the end portions of the slots of the respective members extended laterally in opposite directions, whereby the shield member may move to have its major portion to lie behind the reflector portion.

In testimony whereof, we affix our signatures, in the presence of two witnesses.

MAURUS J. OESTREICH.
HENRY N. OESTREICH.

Witnesses:
MARTHA C. SCOTT,
CHARLES P. DONNELLY.